US008025485B2

United States Patent
Jacobsen

(10) Patent No.: US 8,025,485 B2
(45) Date of Patent: Sep. 27, 2011

(54) WIND TURBINE BLADE ATTACHMENT CONFIGURATION WITH FLATTENED BOLTS

(75) Inventor: Eric Morgan Jacobsen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/817,586

(22) Filed: Jun. 17, 2010

(65) Prior Publication Data

US 2011/0142657 A1   Jun. 16, 2011

(51) Int. Cl.
*F03D 11/00* (2006.01)
*F01D 5/30* (2006.01)
*F16B 35/04* (2006.01)

(52) U.S. Cl. .................... 416/204 A; 411/424
(58) Field of Classification Search ............. 416/204 R, 416/238, 204 A; 411/388, 389, 424
See application file for complete search history.

(56) References Cited

U.S. PATENT DOCUMENTS

| 4,098,167 | A |   | 7/1978  | Dijksterhuis |
|-----------|---|---|---------|--------------|
| 4,338,054 | A | * | 7/1982  | Dahl ............................ 411/424 |
| 5,218,890 | A |   | 6/1993  | Christ, Jr. |
| 7,004,724 | B2 |  | 2/2006  | Pierce et al. |
| 7,322,798 | B2 |  | 1/2008  | Cairo |
| 7,360,310 | B2 |  | 4/2008  | Bagepalli et al. |
| 7,438,533 | B2 | * | 10/2008 | Eyb et al. ...................... 416/230 |
| 7,814,735 | B2 | * | 10/2010 | Neudorf ............................. 56/1 |
| 2008/0050196 | A1 |   | 2/2008 | Cao et al. |
| 2010/0124474 | A1 | * | 5/2010 | Jacobsen et al. ............. 411/427 |

* cited by examiner

*Primary Examiner* — Edward Look
*Assistant Examiner* — Liam McDowell
(74) *Attorney, Agent, or Firm* — Dority & Manning, P.A.

(57) ABSTRACT

A wind turbine includes a plurality of turbine blades, with each of the blades having a root flange that attaches to a flange of a rotor hub by a plurality of circumferentially spaced blade bolts. The blade bolts have opposite cylindrical end sections engaged within the rotor hub flange and blade root flange, respectively, and a non-cylindrical shank extending between the cylindrical end sections. At least one flattened side is defined in the shank along a longitudinal axis of the bolt.

13 Claims, 5 Drawing Sheets

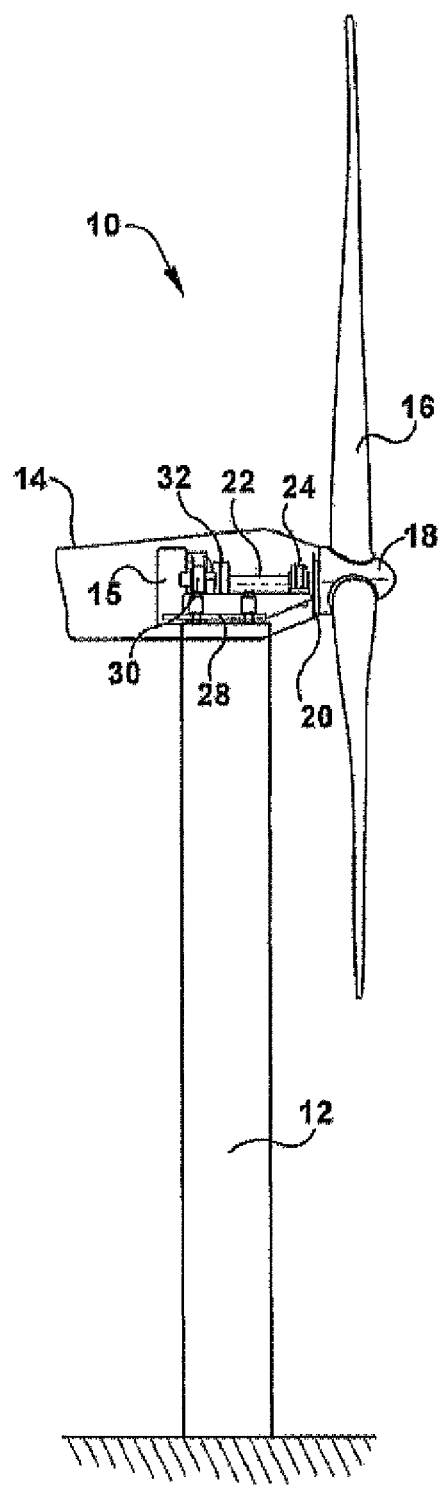
FIG. -1-
*Prior Art*

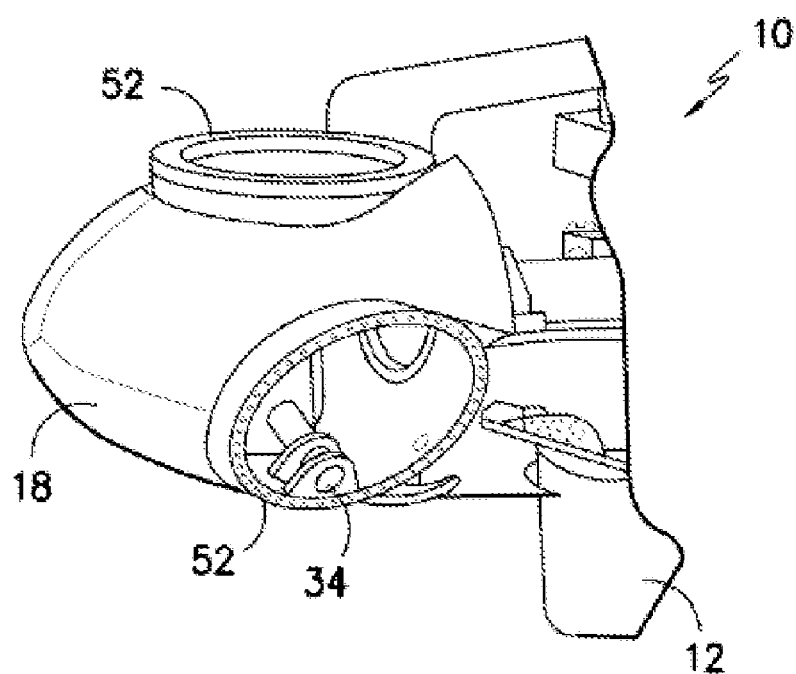
FIG. -2-
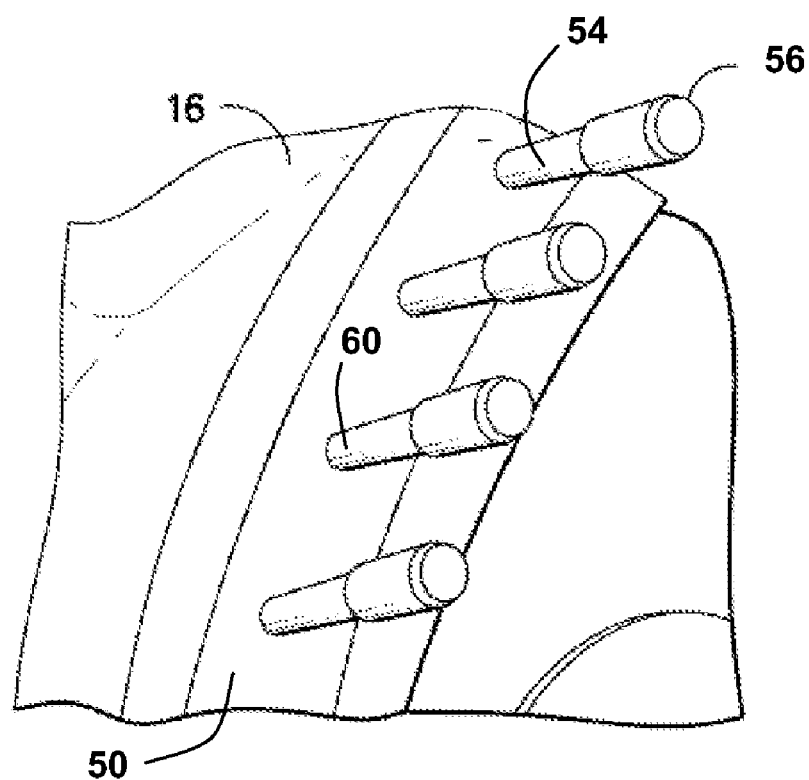
FIG. -3-

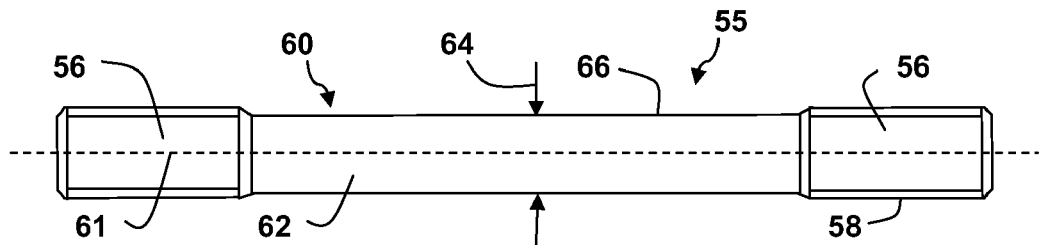
FIG. -4-
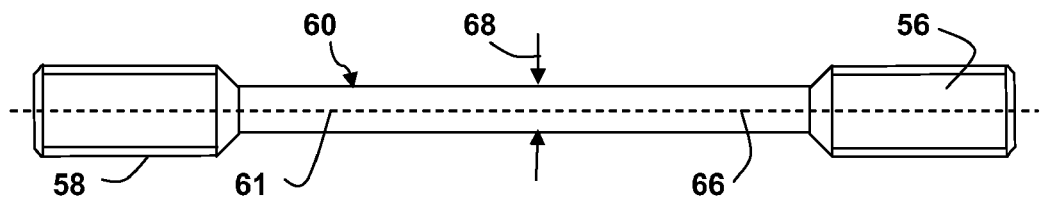
FIG. -5-
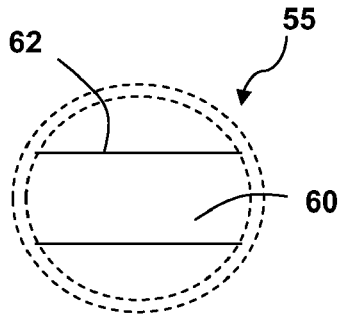
FIG. -6-
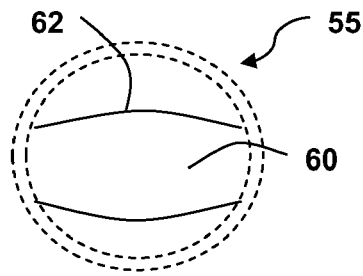
FIG. -7-
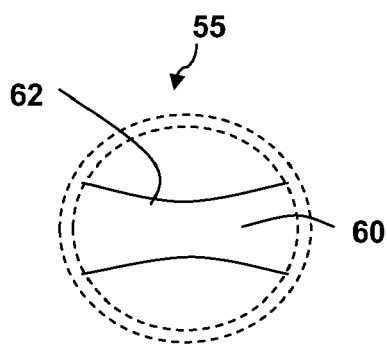
FIG. -8-

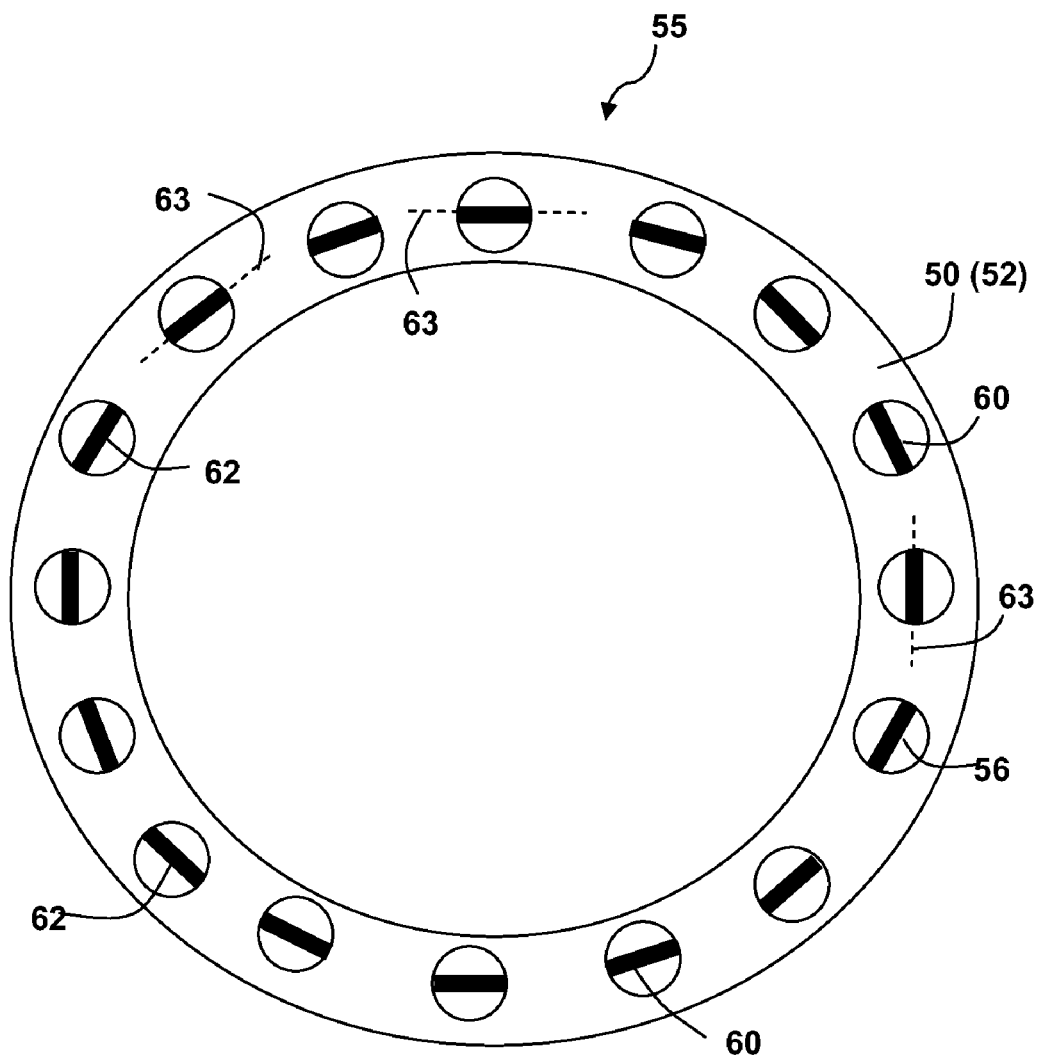
FIG.-9-

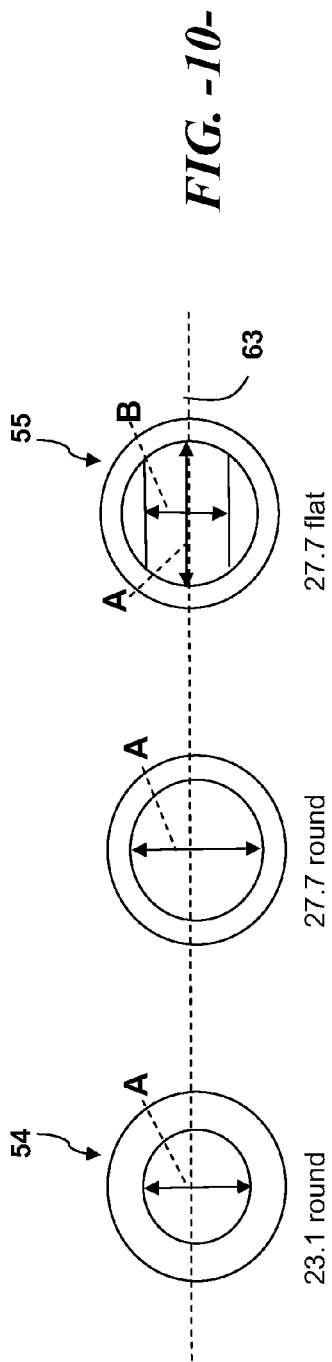
FIG. -10-
| | 1 | 2 | 3 | 4 | 5 | 6 | 7 |
|---|---|---|---|---|---|---|---|
| | 23.1 round | 27.7 round | 27.7 flat B = 16.0 | 27.7 flat B = 18 | 27.7 flat B = 19.4 | 27.7 flat B = 16.1 | 27.7 flat B = 17.9 |
| "A" | 23.1 mm | 27.7 mm | 27.7 mm | 27.7 mm | 27.7 mm | 27.7 mm | 27.7 mm |
| "B" | | | 16.0 | 18.0 | 19.4 | 16.1 | 17.9 |
| Area | 419 mm² | 602.6 mm² | 417.7 mm² | 460 mm² | 489 mm² | | |
| Axial fatigue index | 1.00 | 1.34 | 1.00 | 1.08 | 1.14 | | |
| Bending fatigue index | 0.40 | 0.83 | 0.24 | 0.33 | 0.40 | | |
| Total fatigue index | 1.40 | 2.17 | 1.24 | 1.41 | 1.54 | | |
| Fatigue strength increase | 0.0% | -35.4% | 13.1% | -0.9% | -9.0% | 12.5% | 0.0% |
| Extreme strength increase | 0.0% | 43.8% | -0.5% | 9.8% | 16.7% | 0.0% | 9.1% |
FIG. -11-

WIND TURBINE BLADE ATTACHMENT CONFIGURATION WITH FLATTENED BOLTS

FIELD OF THE INVENTION

The present invention relates generally to the field of wind turbines, and more particularly to a turbine blade attachment configuration.

BACKGROUND OF THE INVENTION

Utility grade wind turbines (i.e., wind turbines designed to provide electrical power to a utility grid) can have relatively large rotors (e.g., 30 meters or more in diameter) and a rotor hub height that exceeds 100 meters. The extreme loads and fatigue stresses placed on the rotor blades of these turbines can be quite significant. Forces such as horizontal and vertical wind shears, yaw misalignment, turbulence, and the like, generate considerable bending of the blades that contributes to the total stresses placed on the blades. A critical design consideration in this regard is the joint between the blade root and the rotor hub.

A conventional joint design utilizes circumferentially spaced blade bolts to secure the blades to the rotor hub. A fundamental design consideration with respect to the bolts is to have a relatively flexible bolt and stiff flange so as to increase fatigue strength of the bolt. It is estimated that from about 40% to 80% of the total stress applied to the bolts is fatigue bending stress. These conventional bolts typically have threaded end sections that engage in threaded bores in the blade root flange and rotor hub flange, respectively. A more advanced wind blade bolt design utilizes a reduced diameter shank portion intermediate of the threaded end sections to increase the axial and bending flexibility of the bolt away from the thread stress concentration. However, this design also reduces the extreme load strength of the bolt due to the small shank diameter.

Accordingly, the industry would benefit from a blade bolt design that reduces bending or fatigue stresses without sacrificing the overall extreme load strength of the bolt.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine is provided having a plurality of turbine blades. Each of the blades has a circular root flange that attaches to a circular flange of a rotor hub by a plurality of circumferentially spaced blade bolts. The bolts have cylindrical end sections engaged within the blade root flange and the rotor hub flange, respectively. In a particular embodiment, these end sections are threaded. A non-cylindrical shank extends between the cylindrical end sections and includes at least one flattened side defined along a longitudinal axis of the bolt. In a particularly unique embodiment, the shank has oppositely facing flattened sides that lie in parallel planes along the longitudinal axis of the bolt. This unique shank profile provides beneficial load and fatigue characteristics to the bolt as compared to a round shank portion (full or reduced diameter), as discussed in greater detail herein.

It should be appreciated that it is not a necessity of the present invention that all of the blade bolts that attach the turbine blade to the rotor hub need be configured as described herein. The invention encompasses any configuration wherein at least one of the blade bolts is in accordance with aspects of the invention.

In a particular embodiment, the blade bolts are rotationally positioned such that the flattened sides are aligned with an axis that is tangential to the blade root flange or rotor hub flange at the respective location of the bolt.

In the embodiment wherein the shank has oppositely facing flattened sides, the shank may have radiused side edges. The shank has a diameter measured between the side edges and a thickness measured perpendicular to the flattened sides. The bolts may be formed (as compared to machined) with the diameter of the shank portion being generally equal to the full roll diameter of the bolt. In other embodiments, the diameter of the shank may be reduced.

The diameter and thickness of the shank section may be defined so as to achieve various fatigue and extreme load strength profiles. For example, at a given shank diameter (e.g., full roll diameter), the shank thickness (measured between the flattened sides) may be defined so as to increase fatigue strength of the bolt without decreasing extreme load strength by more than a defined amount, which may be zero, less than 5%, less than 10%, or any other defined value. In an alternate embodiment, at a given shank diameter (e.g., full roll diameter), the shank thickness may be defined so as to increase extreme load strength of the bolt without decreasing fatigue strength by more than a defined amount, which may be zero, less than 5%, less than 10%, or any other defined value.

In unique embodiments, the shank thickness is defined at the given shank diameter so as to maximize fatigue strength of the bolt without decreasing extreme load strength, or to maximize extreme load strength without decreasing fatigue strength.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is an enlarged perspective view of an embodiment of a rotor hub that particularly illustrates the rotor hub flanges;

FIG. 3 is an enlarged perspective view of a root flange of a turbine blade illustrating conventional blade bolts;

FIG. 4 is a diagrammatic top view of a blade bolt having flattened sides;

FIG. 5 is a side diagrammatic view of the bolt of FIG. 4;

FIGS. 6 through 8 depict various cross-sectional profiles of a shank section of a blade bolt;

FIG. 9 is a front diagrammatic view of a rotor hub or root flange particularly illustrating rotational positions of flattened blade bolts;

FIG. 10 is a diagrammatic view of various blade shank profiles illustrating various diameter and thickness dimensions; and FIG. 11 is a table with the results of calculation based on the various profiles of FIG. 10.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange 20 that turns a main rotor shaft 22. The main rotor shaft 22 is supported by a bearing 24 relative to a bedplate 28. The main flange 20 is attached to the shaft 22 at the forward end thereof and connects with the rotor hub 18. The opposite end of the main rotor shaft 22 is coupled to the gearbox 30 via a shrink coupling 32. The gearbox 30 is connected to a generator 15 via a high speed shaft (not shown). The blades 16 convert motive force of wind into rotational mechanical energy via the shaft 22 and gearbox 30 to generate electricity with the generator 15.

The view of FIG. 1 is provided for illustrative purposes only to place the present invention in an appropriate field of use. It should be appreciated that the configuration of FIG. 1 is not limiting and that the invention may be utilized with any wind turbine configuration.

FIG. 2 illustrates the rotor hub 18 with a plurality of rotor hub flanges 52. The turbine blades 16 (FIG. 1) include a circular root flange 50 (FIG. 3) that attach to a respective rotor hub flange 52 via a plurality of blade bolts 54, as is well known in the art. FIG. 3 illustrates a conventional configuration of the blade bolts 54 wherein each of the bolts includes threaded cylindrical end sections 56 and a reduced-diameter cylindrical shank section 60. FIG. 3 is provided for purposes of illustrating the orientation and location of the blade bolts 54.

FIGS. 4 through 6 illustrate embodiments of blade bolts 55 in accordance with aspects of the invention. The bolts 55 have cylindrical end sections 56 that are configured for physical engagement with the rotor hub flange 52 and blade root flange 50, respectively, by conventional means. For example, in a particular embodiment, each of the cylindrical end sections 56 includes threads 58 for threaded engagement with a respective flange. In alternate embodiments, the end sections may be configured for any other type of suitable engagement within the respective flanges.

A non-cylindrical shank portion 60 is intermediate of the cylindrical end sections 56. The shank section 60 includes at least one "flattened" side that is defined along a longitudinal axis 61 of the bolt 55. It should be understood that the term "flattened" is used herein to describe a profile that is not necessarily flat in a single plane (as illustrated in FIG. 6), but represents a defined side of the shank section 60 having a different profile as compared to the uniform radius of a cylindrical cross-sectional shank. In other words, it is a side of the shank wherein it appears that a portion of material has been removed from a uniform radius shank cylinder such that a reduced or "flattened" profile 62 is produced, which may be flat, curvilinear, serrated, and so forth.

FIGS. 6, 7, and 8 illustrate various embodiments of a shank section 60 having a profile with at least one flattened side 62. In FIG. 6, the oppositely facing sides 62 are flat and lie in parallel planes. In FIG. 7, the sides 62 have a slightly convex shape. In FIG. 8, the sides 62 have a slightly concave shape. It should thus be appreciated that the term "flattened" refers to the reduced aspect of the side 62 as compared to the uniform radius of the cylindrical cross-section.

Referring to FIGS. 5 through 8, in the illustrated embodiment, the shank sections 60 have radiused side edges 66. These side edges 66 may have the same radius of curvature as the cylindrical end sections 56. In particular, in an embodiment wherein the bolts 55 are formed, the diameter 64 (FIG. 4) as measured between the radiused edges 66 is generally equal to the nominal roll diameter of the bolt. Referring to FIG. 5, the flattened sides 62 define a thickness parameter 68 of the shank section 60 that is measured perpendicular to the flattened sides.

It should also be readily appreciated that the present invention encompasses machined bolts 55 wherein the diameter 64 of the radiused edges is defined at any desired dimension.

The wind turbine blades 16 experience bending stresses about a neutral axis that is tangential to the circular root flange 50. The present applicant has found that by removing material from the shank section 60 furthest from this bending axis, bending stresses induced in the bolt 55 can be reduced even compared to the reduced-diameter shanks formed in conventional bolts. As discussed in greater detail below with respect to FIGS. 10 and 11, this reduction in bending stresses can be achieved without sacrificing the extreme load strength of the bolt. As compared to the reduced-diameter conventional shanks, applicant has also found that by adding material along the neutral axis, the load strength of the bolt can be increased without sacrificing the fatigue strength increase. Thought of in another way, the diameter of the shank portion 60 need not be reduced along the neutral axis, but the sides of the shank portion 60 perpendicular to the axis can be flattened or reduced.

FIG. 9 depicts a plurality of the bolts 55 having shank sections 60 with oppositely facing flattened sides 62. The bolts are rotationally oriented such that the flattened sides 62 of each bolt 55 lie in the neutral bending axis 63 at each bolt location around the flange 50 (or 52), the axis 63 being tangential to the flange at the bolt location.

It should be appreciated that the relative dimensions of the shank section diameter 64 and thickness 68 can be selected to achieve certain desired load and fatigue strength characteristics. For example, at a given diameter of the shank section 60 (for example the nominal roll diameter), the thickness dimension 68 defined between the flattened sides 62 may be selected so as to increase fatigue strength of the bolt without decreasing the extreme load strength of the bolt. In this regard, the thickness may be defined so as to maximize the fatigue strength of the bolt without decreasing the extreme load strength. In an alternative embodiment, at the same given diameter, the thickness dimension 68 may be defined so as to increase the extreme load strength of the bolt without decreasing the fatigue strength. For example, the thickness may be defined so as to maximize the extreme load strength of the bolt without decreasing the fatigue strength.

In still alternate embodiments, at a given diameter dimension 64, the thickness dimension 68 may be defined so as to increase fatigue strength of the bolt without decreasing the extreme load strength by more than a certain amount, for example by more than about 5%. In this regard, the thickness dimension may be defined so as to increase the fatigue strength of the bolt by a minimum amount, for example 10%, without decreasing the extreme load strength of the bolt by more than a certain amount, for example, about 1%.

In still another embodiment, at the given diameter 64 of the shank section 60, the thickness dimension 68 may be defined so as to increase the extreme load strength of the bolt without decreasing the fatigue strength by more than a certain amount, for example by more than about 10%.

FIGS. 10 and 11 illustrate certain of the characteristics of the bolts 55 described herein. FIG. 10 illustrates three diagrams of a blade bolt. The first diagram illustrates a conventional reduced-diameter blade bolt having a shank diameter A of about 23.1 mm. The second diagram illustrates a bolt having a full nominal roll diameter of about 27.7 mm. The third diagram in FIG. 10 illustrates a blade bolt made in accordance with aspects of the present invention having a shank section diameter A that is equal to the full nominal diameter of 27.7 mm and a flattened shank thickness value B having the values indicated in the table of FIG. 11. FIG. 10 also illustrates the neutral bending axis 63.

FIG. 11 is a table that illustrates certain calculations reflective of the advantages of the flattened side shank configuration. The first column in FIG. 11 relates to the conventional reduced-diameter shank bolt wherein the full nominal diameter of the bolt has been reduced from 27.7 mm to 23.1 mm. This reduced-diameter profile provides a shank area of 419 mm$^2$ and a total fatigue index of 1.40. This shank profile may be thought of as the "control" for purposes of the present comparison. As such, the fatigue strength increase and extreme strength increase for this profile are set at 0%. The second column 11 illustrates the full diameter shank profile that generates a cross-sectional area of 602.6 mm$^2$ with a total fatigue index of 2.17. As compared to the control profile, this profile generates an extreme strength increase of about 43.8% but reduces the fatigue strength by 35.4% as compared to the control profile.

The next three columns in FIG. 11 illustrate the various results of providing the frill nominal diameter shank section with flattened sides. In the third column, the thickness dimension B of the flattened sides is 16.0 mm. This profile produces a total fatigue index of 1.24 with a fatigue strength increase of 13.1% as compared to the control and with only a 0.5% decrease in extreme strength as compared to the reduced-diameter control profile.

The fourth column in FIG. 11 depicts a thickness dimension B of 18 mm, which generates a cross-sectional area of 460 mm$^2$. This profile produces a total fatigue index of 1.41 with an extreme strength increase of 9.8% as compared to the control profile and with only a 0.9% decrease in fatigue strength.

The next column in FIG. 11 illustrates the results of increasing the thickness dimension B of the shank section to about 19.4 mm, which provides a cross-sectional area of the shank section of 489 mm$^2$ with a total fatigue index of 1.54. This profile results in an extreme strength increase of about 16.7%, but with a loss of fatigue strength of about 9.0% as compared to the reduced-diameter control profile.

The sixth column in FIG. 11 illustrates an embodiment wherein the thickness dimension B is selected so as to maximize the fatigue strength increase without decreasing the extreme strength of the bolt as compared to the reduced diameter control profile. In this embodiment, the thickness dimension is set at 16.1 mm, which results in an increase in fatigue strength of about 12.5% without any decrease in extreme strength as compared to the reduced-diameter control profile.

The last column in FIG. 11 illustrates an embodiment wherein the thickness dimension B is selected so as to maximize an increase in extreme strength without a loss of fatigue strength. In this embodiment, the thickness dimension B is defined at 17.9 mm, which results in an increase of about 9.1% in extreme strength without any loss in fatigue strength as compared to the reduced diameter control profile.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine, comprising:
   a plurality of turbine blades, each of said blades having a root flange that attaches to a flange of a rotor hub by a plurality of circumferentially spaced blade bolts;
   each said blade bolt comprising:
   opposite cylindrical end sections engaged within said rotor hub flange and said blade root flange, respectively;
   a shank extending between said cylindrical end sections; and
   oppositely facing flattened sides defined in said shank along a longitudinal axis of said bolt;
   wherein said shank has radiused side edges with a diameter measured between said side edges and a thickness measured perpendicular to said flattened sides, and wherein said diameter is generally equal to or less than a full roll diameter of said blade bolt.

2. The wind turbine as in claim 1, wherein said flattened sides lie in parallel planes along the longitudinal axis of said bolt.

3. The wind turbine as in claim 2, wherein said bolts are rotationally positioned such that said flattened sides are aligned with an axis that is tangential to said rotor hub flange at each location of a respective said bolt.

4. The wind turbine as in claim 3, wherein at said diameter, said thickness is defined so as to increase extreme load strength of said bolt without decreasing fatigue strength.

5. The wind turbine as in claim 4, wherein at said diameter, said thickness is defined so as to maximize extreme load strength of said bolt without decreasing fatigue strength.

6. The wind turbine as in claim 4, wherein said bolts are formed and said diameter is generally equal to said nominal roll diameter of said bolt.

7. The wind turbine as in claim 1, wherein at said given diameter, said thickness is defined so as to increase fatigue strength of said bolt without decreasing extreme load strength.

8. The wind turbine as in claim 7, wherein at said diameter, said thickness is defined so as to maximize fatigue strength of said bolt without decreasing extreme load strength.

9. The wind turbine as in claim 7, wherein said bolts are formed and said diameter is generally equal to said nominal roll diameter of said bolt.

10. The wind turbine as in claim 7, wherein said bolts are formed and said diameter is generally equal to said nominal roll diameter of said bolt, and wherein, at said diameter, said thickness is defined so as to increase fatigue strength of said bolt without decreasing extreme load strength by more than about 5.0%.

11. The wind turbine as in claim 10, wherein said thickness is defined so as to increase fatigue strength of said bolt by at least 10% without decreasing extreme load strength by more than about 1.0%.

12. The wind turbine as in claim 7, wherein said bolts are formed and said diameter is generally equal to said nominal roll diameter of said bolt, and wherein, at said diameter, said thickness is defined so as to increase extreme load strength of said bolt without decreasing fatigue strength by more than about 10.0%.

13. The wind turbine as in claim 12, wherein said thickness is defined so as to increase extreme load strength of said bolt by at least 10% without decreasing fatigue strength by more than about 1.0%.

* * * * *